United States Patent [19]

Thaler et al.

[11] 3,856,763

[45] Dec. 24, 1974

[54] PROCESS FOR THE PREPARATION OF HIGH MOLECULAR WEIGHT, HIGH UNSATURATION ISOBUTYLENE-CONJUGATED DIENE COPOLYMERS

[75] Inventors: Warren A. Thaler, Matawan; Donald J. Buckley, Sr., Plainfield, both of N.J.; Joseph P. Kennedy, Akron, Ohio

[73] Assignee: Exxon Research & Engineering Co., Linden, N.J.

[22] Filed: Apr. 6, 1973

[21] Appl. No.: 348,678

Related U.S. Application Data

[63] Continuation-in-part of Ser. No. 151,038, June 8, 1971, Pat. No. 3,808,177.

[52] U.S. Cl. .............................. 260/80.7, 260/85.3 R
[51] Int. Cl. ......................... C08d 1/04, C08f 1/72
[58] Field of Search .......................... 260/80.7, 85.3

[56] References Cited
UNITED STATES PATENTS

| | | | |
|---|---|---|---|
| 2,577,822 | 12/1951 | Sparks et al. | 260/80.7 |
| 2,772,255 | 11/1956 | Ernst et al. | 260/85.3 |
| 3,080,337 | 3/1963 | Minckler et al. | 260/45.5 |
| 3,239,495 | 3/1966 | Small et al. | 260/80.7 |
| 3,511,821 | 5/1970 | Parker et al. | 260/80.7 |

FOREIGN PATENTS OR APPLICATIONS

| | | | |
|---|---|---|---|
| 1,036,618 | 7/1966 | Great Britain | 260/85.3 |

*Primary Examiner*—Stanford M. Levin
*Attorney, Agent, or Firm*—Anthony Lagani, Jr.

[57] ABSTRACT

A process for preparing substantially gel-free, high molecular weight, high unsaturation copolymers of an isoolefin and conjugated diolefins having a number average molecular weight of at least 120,000 and a mole percent of unsaturation of at least 5 percent which comprises carrying out the polymerization in a homogeneous phase, introducing the catalyst comprising a hydrocarbyl aluminum dihalide and carrying out the reaction at a temperature of less than −100°C.

13 Claims, 8 Drawing Figures

CRITICAL HOMOGENEOUS POLYMERIZATION TEMPERATURE VS. DIENE CONTENT AT MAXIMUM MONOMER CONCENTRATION

POLYMERIZATION TEMPERATURE VS. MOLECULAR WT. (NO. AVERAGE) FOR ISOBUTYLENE-CYCLOPENTADIENE COPOLYMERS

CONVERSION VS. TEMPERATURE
($D_1$ & $D_5$ CONSTANT CATALYST AND TIME)

CATALYST EFFICIENCY VS. COSOLVENT CONCENTRATION
($D_5$, -120°C)

GLASS TRANSITION TEMPERATURE (DSC) VS. CPD CONTENT

CORRELATION OF D# WITH MOLE % CYCLOPENTADIENE
FOR ISOBUTYLENE-CYCLOPENTADIENE MONOMER FEED

PROCESS FOR THE PREPARATION OF HIGH MOLECULAR WEIGHT, HIGH UNSATURATION ISOBUTYLENE-CONJUGATED DIENE COPOLYMERS

CROSS REFERENCE TO RELATED APPLICATION

This application is a continuation-in-part of U.S. application Ser. No. 151,038, filed June 8, 1971, now U.S. Pat. No. 3,808,177.

BACKGROUND OF INVENTION

Polymers and copolymers of isobutylene are well known in the art. In particular, copolymers of isobutylene with conjugated multiolefins have found wide acceptance in the rubber field. These polymers are generally termed in the art "butyl rubber." The preparation of butyl rubber is described in U.S. Pat. No. 2,356,128, which is incorporated herein by reference.

The term "butyl rubber" as employed in the specification is intended to include copolymers made from the polymerization of a reaction mixture comprising an isoolefin having about four to seven carbon atoms, e.g., isobutylene and a conjugated multiolefin having about four to 14 carbon atoms, e.g., isoprene. Although these copolymers are said to contain about 0.2 to about 15 percent combined multiolefin, in practice the butyl rubber polymers of commerce contain about 0.6 to about 4.5 wt. percent of multiolefin; more generally, about 1.0 to about 1.8 wt. percent, the remainder of the polymer being comprised of the isoolefin component.

Efforts to prepare isoolefin-multiolefin polymers of high unsaturation have met with varying degrees of success. Where substantially gel-free polymers have been prepared containing more than about 5 percent multiolefin, the polymers have been of low number average molecular weight. This has been true even where these polymers had high viscosity average molecular weights. In general, however, the products formed by prior art processes are either high in gel content or low in number average molecular weight and of little utility. In order to have practical commercial utility as a synthetic rubber, the isobutylene-multiolefin copolymers must be substantially gelfree and have a number average molecular weight of at least 120,000.

Multiolefins are known to be molecular weight and catalyst poisons; furthermore, increased unsaturation in the polymer backbone provides potential sites for gelation. Hence, attempts to prepare more highly unsaturated isoolefin-multiolefin copolymers by prior art methods have resulted in the formation of either low molecular weight or resinous cross-linked polymers which have little or no commercial utility as elastomers.

Although some commerical elastomers such as styrene butadiene rubber or EPDM may contain as much as 2 to 9 percent gel, isobutylene copolymers of commerce are substantially gel free. The isobutylene copolymers may contain as much as 2 percent gel but preferably contain less than 1 percent.

There are numerous patents and literature disclosures which generally disclose polymers and copolymers of isobutylene, the copolymers purportedly having from about 0.5 to 98 percent unsaturation. Where the prior art copolymers are high in unsaturation, however, they are either low in number average molecular weight or resinous.

Japanese Pat. No. JA27416/68 published 11/26/68 teaches a process for preparing copolymers of conjugated diene compounds with isobutylene which contain "a large amount of conjugated diene compounds" using catalysts prepared by reacting (1) mercuric halide, aluminum halide or hydrogen halide, (2) zirconium halide and (3) aluminum metal in the presence of an aromatic compound, e.g., benzene. These products are described as copolymers which are "rubbery substances when the isobutylene is high and are resinous when the isobutylene content is low." The resinous properties result from gelation and crosslinking of the polymer during its preparation. These gelled and crosslinked products have little utility as rubbers. The products of low unsaturation, i.e., high isobutylene content rubbers, are of the conventional butyl rubber type.

Japanese Pat. No. JA27417/68 published 11/26/68 teaches a method for preparing copolymers of dienes and isoolefins containing about 0.1 to about 40 wt. percent, preferably about 0.5 to 5 wt. percent of diene. The polymers are prepared using a catalyst derived from (1) metal oxides of the general formula $M_xO_y$, wherein M is nickel or cobalt and $1 < y/x \leq 1.5$, and (2) aluminum halide. Again, the low saturation polymers are the conventional butyl rubbers whereas the highly unsaturated materials are either low in number average molecular weight or are gelled polymers.

U.S. Pat. No. 3,356,661 teaches a method for preparing copolymers of isobutylene and butadiene-1,3 hydrocarbons, for example copolymers of isoprene and isobutylene. The copolymers produced by the process disclosed are either lower molecular weight, i.e., less than 100,000 viscosity average molecular weight or gelled polymers.

U.S. Pat. No. 3,165,503 teaches a method for polymerizing butadiene-1,3 hydrocarbons, e.g., isoprene. The invention of this patent is directed primarily towards the preparation of polyisoprene. However, copolymers of isoprene and isobutylene are disclosed. The preferred copolymers are said to contain from about 1 to 50 wt. percent of butadiene-1,3 hydrocarbon units. Hydrocarbon copolymers of isoolefin and conjugated dienes prepared by the method taught by the patentee are found to be low in number average molecular weight or gelled polymers.

U.S. Pat. No. 3,466,268 and its parent counterpart, U.S. Pat. No. 3,357,960 disclose a butadiene isobutylene copolymer and a process for preparing said copolymer. The invention disclosed is a method of improving butadiene polymers by incorporating in the structure varying amounts of isobutylene. Preferably, the amount of isobutylene incorporated is said to be about 2 to 40 wt. percent. The polymers disclosed are generally low in number average molecular weight. Substitution of isoprene for butadiene results in higly crosslinked copolymers which have little utility.

U.S. Pat. No. 2,772,255 (Br. 744,514) discloses a method for preparing high molecular weight butyl rubbers. In general, the polymers which are prepared are conventional butyl rubbers having less than 3 mole percent unsaturation. Attempts to produce butyl rubber type polymers having unsaturation in excess of 5 mole percent unsaturation result in products which either are low in number average molecular weight or are gelled and highly crosslinked.

British Pat. No. 1,036,618 teaches a method for preparing isoolefin-conjugated diolefin copolymers using as the catalyst and alkyl aluminum dihalide. The products produced by the process which are high in unsaturation are generally low in number average molecular weight.

High unsaturation isobutylene-isoprene copolymers have been prepared (see, for example, U.S. Pat. No. 3,242,147 incorporated herein by reference). Although these polymers are purportedly high in viscosity average molecular weight, the number average molecular weights are low. Hence, the products have little commercial significance.

Unlike plastics, elastomers require a high number average molecular weight in order to realize desirable levels in physical properties. For example, tensile strength for elastomers is critically dependent on number average molecular weight since these polymers are used well above their glass transition temperature and are generally amorphous.

In contrast to elastomers, plastics are used well below their glass transition temperature and it is molecular associations which give them their structural integrity. As a result, number average molecular weights in the order of 10,000 to 70,000 are adequate for commercial utility.

Elastomers, on the other hand, obtain their structural integrity from a crosslinked network. Perfection of this network is directly dependent on the length of the polymer molecules from which the network is derived. Number average molecular weight ($\overline{M}n$) is a measure of the length of the molecules. Viscosity or weight average molecular weights are misleading measurements since their numerical value is greatly affected by small variations in the distribution of the higher molecular weight fractions. Hence, polymers of low number average molecular weight may have high viscosity average molecular weight as a result of disproportionate distribution of the high molecular weight fraction.

The importance of number average molecular weight on tensile strength has long been recognized (see, for example, Flory, p. 5, *Ind. Eng. Chem.*, 38, 417 (1946), incorporated herein by reference. Flory showed that for low unsaturation elastomeric copolymers of isobutylene tensile strength increased rapidly as the number average molecular weight was increased beyond a minimum value (i.e., 100,000) then approaches an asymptotic limit.

For economic reasons, oil extendability is an essential characteristic of a commercial elastomer for almost all major uses. The tensile strength of butyl rubber vulcanizates is reduced by the addition of oil, and to retain the original tensile strength of the undiluted composition it is necessary to increase the number average molecular weight. Oil extension also improves the low temperature properties of butyl innertubes and when this phenomenon was discovered, it was necessary to develop higher molecular weight polymers to accommodate the added oil. See, for example, Buckley et al., *Ind. Eng. Chem.*, 42, 2407 (1950).

This finding resulted in the rapid adoption by industry of the high molecular weight type of butyl GR–1–18 with Mooney viscosity greater than 71 (212°F.). These materials generally have number average molecular weights of 150,000 or greater. In contrast, the previously used polymers which have number average molecular weights of less than 120,000 with Mooney viscosity specification of 38–49 (212°F.) were limited to applications which did not require oil extension, and today represents a very minor portion of the butyl rubber market having been supplanted almost entirely by the higher molecular weight butyl rubbers.

Although it has been postulated that higher unsaturation copolymers of isobutylene would be attractive polymers, useful polymers have not been available since the prior art methods are not capable of producing highly unsaturated, e.g., at least 5 mole percent to about 40 mole percent, isobutylene copolymers of sufficiently high number average molecular weight, e.g., at least 120,000. Hence, the prior art isobutylene-conjugated diene copolymers offered commercially are low in unsaturation, e.g., 1–4.5 mole percent.

Hence, heretofore, methods of preparing copolymers of isoolefins and conjugated dienes have not included a means for making commercial quality elastomers containing greater than 5 mole percent diene. To be of commercial quality the elastomer must be substantially gel free and have a number average molecular weight ($\overline{M}n$) of at least 120,000.

Although the isobutylene-conjugated dienes of commerce have improved ozone resistance, these polymers are still subject to ozone cleavage since the site of unsaturation is in the polymer backbone. It has been postulated that isobutylene copolymers having unsaturation on the side chain rather than the backbone would be highly resistant to ozone attack. Attempts to produce such polymers using cyclopentadiene as the diene comonomer have been notably unsuccessful.

Isobutylene-cyclopentadiene copolymers of the prior art have been too low in molecular weight to be of commercial significance. Some improvement in molecular weight has been accomplished by copolymerizing isobutylene with minor amounts of cyclopentadiene (CPD) along with other monomers including crosslinking agents such as divinyl benzene. The resulting products are somewhat improved terpolymers or tetrapolymers resulting from the linking of the low molecular weight isobutylene-CPD chains into two dimensional highly branched polymers. Such polymers, however, have inferior physical properties as compared to the butyl rubbers of commerce and hence have not gained acceptance.

A review of the art illustrates the problems encountered where attempts were made prepare preapre copolymers of isobutylene and cyclopentadiene (CPD). For example, U.S. Pat. No. 2,577,822, incorporated herein by reference, teaches the need for the addition of divinyl benzene in order to compensate for the deleterious effect of CPD on molecular weight.

U.S. Pat. No. 3,080,337, incorporated herein by reference, teaches the addition of isoprene as a third monomer but the resulting products are low in unsaturation and have poor physical properties. Others have made various attempts to produce CPD isoolefin copolymers with varying degrees of success; see, for example, U.S. Pat. Nos. 3,239,495; 3,242,147; 2,521,359; British Pat. No. 1,036,618 and *I & EC Prod R and D* 1, 216–20 (1962) incorporated herein by reference. These polymers, however, have substantially no commercial significance because, even when only minor amounts of CPD were present, they are low in number average molecular weight.

SUMMARY OF INVENTION

It has surprisingly been found that substantially gel-free copolymers of isoolefins and conjugated dienes having a mole percent unsaturation of at least 5 percent and a number average molecular weight ($\overline{M}n$) of at least 120,000 may be prepared by carrying out the polymerization in the presence of not more than about 40 wt. percent, based on the total reaction mixture, of a vehicle which is a solvent for the polymer at the polymerization temperature and carrying out the reaction at a temperature of less than −100°C. The catalyst must be a hydrocarbyl aluminum dihalide.

The quantity of cosolvent used is kept to a minimum in order to maximize molecular weight. The optimum cosolvent level is determined by selecting the minimum solvent-monomer ratio at which the copolymer to be prepared remains in solution at the polymerization temperature.

Surprisingly, the process of this invention makes it possible to prepare isobutylene-cyclopentadiene (CPD) copolymers of high number average molecular weight. Terpolymers of isobutylene, CPD and a third conjugated multiolefin have unexpected ozone resistance.

BRIEF DESCRIPTION OF DRAWINGS

FIG. I shows the relationship between critical homogeneous polymerization temperature and diene content.

FIG. II shows the effect of polymerization temperature on number average molecular weight.

Figure 1:
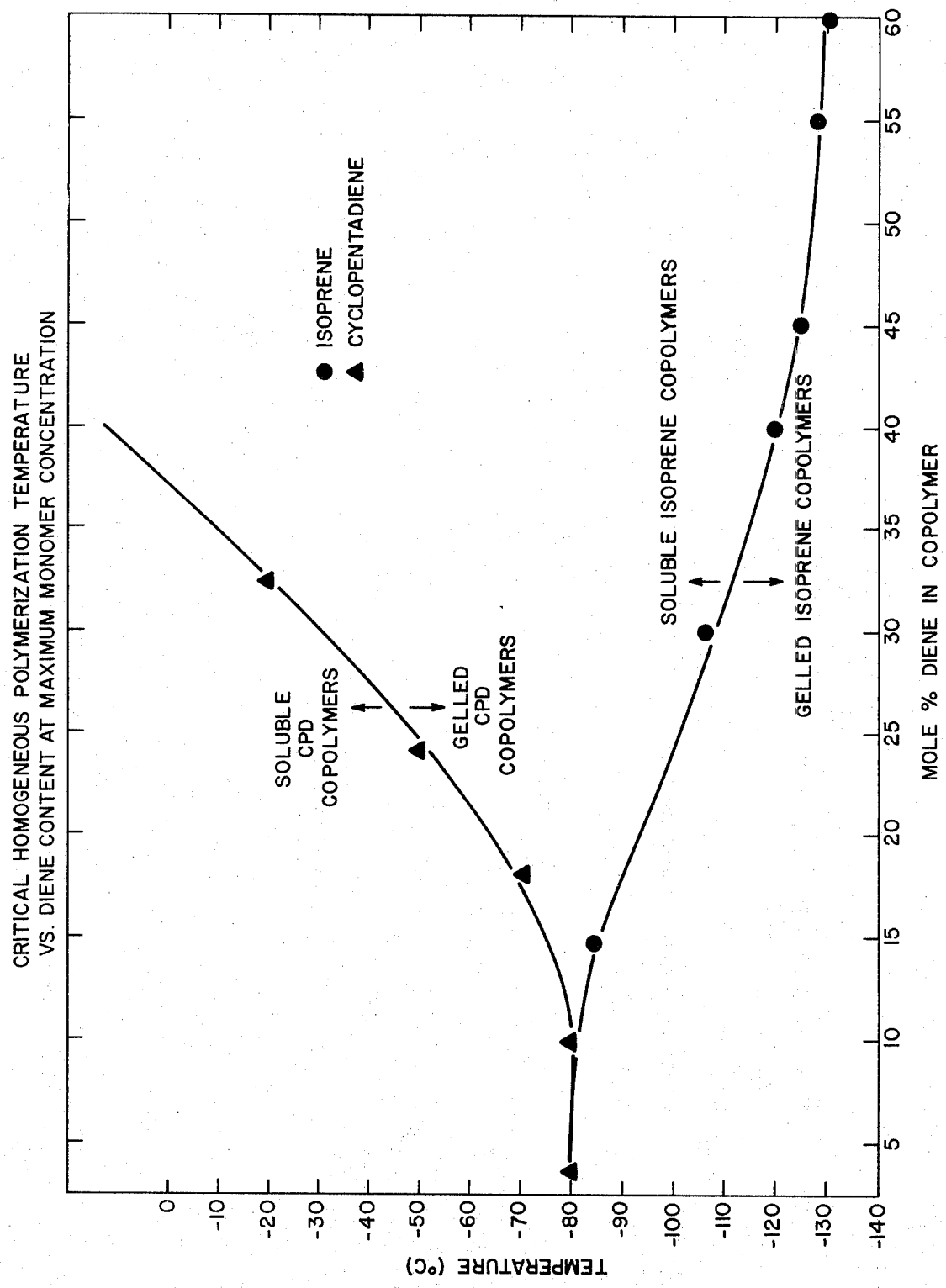

FIG. III shows the effect of cosolvent concentration on molecular weight.

FIG. IV shows the effect of polymerization temperature on conversion.

FIG. V shows catalyst efficiency as a function of cosolvent concentration.

FIG. VI shows the relationship between mole percent cyclopentadiene in the feed as compared to mole percent cyclopentadiene in the polymer.

FIG. VII shows the relationship between glass transition temperature and mole percent cyclopentadiene enchainment in the copolymer.

FIG. VIII is a correlation of D # with mole percent cyclopentadiene in the monomer feed.

DETAILED DESCRIPTION

This invention relates to a method of preparing substantially gel-free copolymers of an isoolefin and conjugated dienes wherein said copolymers have a number average molecular weight of at least 120,000 and a mole percent unsaturation of at least 5 percent. The preferred polymers of this invention have a number average molecular weight of at least 130,000; more preferably at least 140,000; most preferably 150,000; e.g., at least 160,000.

The polymers of this invention include terpolymers of isoolefin, cyclopentadiene and a third conjugated diene.

In the preparation of the copolymers of this invention, any cationically polymerizable conjugated diolefin may be copolymerized with a cationically polymerizable isoolefin.

The isoolefin suitable for use in the practice of the inventions are preferably hydrocarbon monomers having about four to about 10 carbon atoms. Illustrative nonlimiting examples of these isoolefins are isobutylene, 2-methyl-1-butene, 3-methyl-1-butene, 4-methyl-1-pentene, beta-pinene, etc. Preferably, the isoolefin is isobutylene.

The conjugated diolefins suitable for use in this invention are conjugated hydrocarbon multiolefins having five to about 14 carbon atoms; more preferably, the multiolefins are conjugated diolefins of five to nine carbon atoms. Illustrative nonlimiting examples of these conjugated diolefins are isoprene, piperylene, 2,3-dimethyl butadiene, 2,5-dimethylhexadi2,4-ene, cyclopentadiene, cyclohexadiene, methylcyclopentadiene, etc. Most preferred conjugated diolefins are isoprene, piperylene, and cyclopentadiene.

In order to obtain number average molecular weights of at least 120,000, the reaction must be carried out below −100°C., preferably about −110° to −140°C., more preferably about −110°C. to about −135°C., most preferably about −115° to −130°C., e.g., −120°C. To obtain the desired number average molecular weight in a substantially gel-free polymer, a homogeneous polymerization is required. This is achieved by carrying out the reaction in a vehicle which is a solvent for the copolymer at the reaction temperature. The vehicle comprises predominantly the monomers to be polymerized in conjunction with an inert cosolvent or mixtures of inert cosolvents plus catalyst solvent. The vehicle (monomers plus cosolvent) must of course be liquid at the polymerization temperature.

It is essential in carrying out the process of this invention that the cosolvent comprise at least 5 percent by volume and not more than 40 percent by volume of the total reaction mixture. Preferably, about 5 to about 30 volume percent solvent is used; more preferably about 7.5 to 25 weight percent, most preferably about 10 to about 20 weight percent, e.g., 15 volume percent.

The term "total reaction mixture" as used in the specification and claims means total monomers plus cosolvent.

The optimum amount of cosolvent to be used is the minimum amount necessary to avoid reactor fouling or gelation. If too little cosolvent is used reactor fouling or gelation of the product results. Too high a level results in undesirable lowering of number average molecular weight.

For the purposes of this invention, it is convenient to define the volume percent of inert cosolvent as that calculated based on the volume of monomers at the polymerization temperature while the volume of cosolvent is determined at 25°C. The volume percent of cosolvent as calculated is uncorrected for volume changes and cooling of the solvent to reaction conditions. The volume of monomers such as cyclopentadiene which freeze at the polymerization temperature were measured at −78°C. (dry ice temeprature).

The minimum quantity of a given cosolvent required to produce gel-free polymers is a function of the cosolvent, the conjugated diolefin used and the polymerization temperature. Having selected the composition of the monomer blend and the cosolvent to be used the minimum quality of cosolvent required is readily determined by carrying out the polymerization using varying amounts of cosolvent. The minimum quantity of cosolvent necessary is that amount required to maintain a homogeneous system; that is to prevent precipitation of polymer during polymerization.

The term "cosolvent" as used in this specification and claims means the inert solvent which, together with the monomers and catalyst solvent, comprises the vehicle for the polymerization. The cosolvent may also serve as the catalyst solvent in these reactions. The cosolvent, monomers and catalyst solvent must be mutually soluble and the blend of monomers plus cosolvent plus catalyst solvent must be a solvent for the copolymer at the polymerization temperature. The term "inert" means that the cosolvent will not react with the catalyst or otherwise enter into the polymerization reaction. The cosolvent must not contain substituents in its molecule which will interfere with the polymerization reaction. Aliphatic hydrocarbons are suitable cosolvents. The preferred cosolvents are paraffinic hydrocarbons, and carbon disulfide. Preferably, the paraffinic hydrocarbon solvent is a $C_5$–$C_{10}$ hydrocarbon, more preferably a $C_5$ to $C_8$ hydrocarbon. Illustrative examples of the hydrocarbon solvents are pentane, isopentane, methyl pentane, hexane, cyclohexane, methylcyclohexane, dimethylcyclohexane, heptane, isooctane, 1,2,3,3-tetramethyl hexane, tetramethyl cyclohexane, etc. Generally any paraffin, whether normal, branched or cyclic which is a liquid under polymerization conditions, may be used. The term "paraffin" as used in the specification and claims includes normal paraffins, cycloparaffins and branched paraffins.

It will be evident to those skilled in the art that since the monomers act as part of the solvent system for the copolymer, the conversion level of the polymerization must not be so great as to result in precipitation of the copolymer as a result of depletion of solvent. Preferably the conversion level is about 2 to about 20 percent; more preferably about 3 to 15 percent; most preferably about 5 to about 13 percent, e.g., 10 percent.

In the practice of this invention the catalyst must be a hydrocarbyl aluminum dihalide. The hydrocarbyl group can be a $C_1$–$C_{18}$ straight chain, branched or cyclic group. Both cycloaliphatic and aromatic substituents can comprise the hydrocarbyl radical. Alkyl groups, especially lower alkyl groups, e.g., $C_1$–$C_4$, are preferred because of their general availability and economy of use. The halide can be bromine or chlorine, preferably chlorine. The term "dihalide" as used in the specification and claims means dichloride or dibromide.

Illustrative examples of these hydrocarbyl aluminum dihalides are methylaluminum dichloride, ethylaluminum dichloride, isobutylaluminum dichloride, methylaluminum dibromide, ethylaluminum dibromide, benzylaluminum dichloride, phenylaluminum dichloride, xylylaluminum dichloride, toluylaluminum dichloride, butylaluminum dichloride, hexylaluminum dichloride, octylaluminum dichloride, cyclohexylaluminum dichloride, etc. The preferred catalysts are methylaluminum dichloride, ethylaluminum dichloride and isobutylaluminum dichloride.

The catalyst may be added neat or in solution. Preferably where a catalyst solvent is used, it is a liquid paraffin solvent or cycloparaffin solvent. It is advantageous though not necessary to use paraffins of low freezing point. Methylcyclohexane is particularly useful since catalyst solutions of about 1 percent concentration do not freeze at −120°C.

The concentration of the catalyst is not critical. Very dilute catalyst solutions, however, are not desirable since substantial fractions of the catalyst may be deactivated by impurities. Very concentrated solutions are undesirable since at polymerization temperatures catalyst may be lost by freezing out of solution.

In carrying out the polymerization of this invention those skilled in the art will be aware that only catalytic amounts of catalyst are required. Preferably the volume ratio of monomers plus cosolvent to catalyst is about 1,000:1 to about 9:1; more preferably about 250:1 to about 10:1; most preferably about 200:1 to about 20:1.

The catalyst solution injected into the reactor may comprise 0.01 to 100 percent by weight. A solution comprising 0.1 to about 40 percent by weight is preferred; most preferably about 0.1 to about 20 percent; most preferably 0.2 to about 2 percent.

In practicing the process of this invention, it is essential that the polymerization be carried out in the homogeneous phase without the precipitation of polymer. Conventional slurry processes are inapplicable for the preparation of the high unsaturation polymers of this invention since by their nature they result in polymer precipitation with gelation of the polymer as a consequence.

The amount of cosolvent required in order to maintain the polymerization reactants and product in solution throughout the polymerization is a function of the conjugated diolefin selected for polymerization and its concentration in the monomer feed. The polymerization temperature at which precipitation of polymer will occur is itself a function of the amount of and type of cosolvent and the particular multiolefin being copolymerized.

The term "critical homogeneous polymerization temperature" as used in the specification and claims means that polymerization temperature below which precipitation of polymer will occur when no cosolvent is included in the reaction mixture, i.e., the only solvent for the reactants and product being the monomer feed.

Characterization of polymers prepared by bulk polymerization, i.e., without cosolvent, shows that the polymers formed are low in number average molecular weight ($\overline{M}n$). In order to increase $\overline{M}n$, the lowering of polymerization temperature is an obvious expedient. However, in the absence of cosolvent, the result is not greater $\overline{M}n$ but gelation.

The terms "unsaturation" or "diolefin content" as used with reference to the amount of diolefin enchainment in the product are equivalent terms. The composition of the copolymer (mole percent unsaturation = mole percent diene content) is substantially the same as the composition of the feed for isoprene or piperylene. However, where the conjugated diolefin is cyclic, as for example cyclopentadiene, it is present in considerably higher amounts, e.g., 3 to 4 times, in the copolymer as in the feed.

The problem of gelation is obviated by the addition of a cosolvent which permits the lowering of polymerization temperature below the critical homogeneous polymerization temperature. It has been found that polymerization temperatures of at least −100°C. are necessary in order to achieve $\overline{M}n$ values of at least 120,000. At least 5 volume percent inert solvent based on the monomer feed is necessary in order to carry out the polymerization in solution at these low temperatures.

The polymers of this invention have $\overline{M}n$ of at least 120,000. Preferably the $\overline{M}n$ is at least 130,000; more preferably at least 140,000; most preferably at least 150,000, e.g., 160,000.

Figure 2:
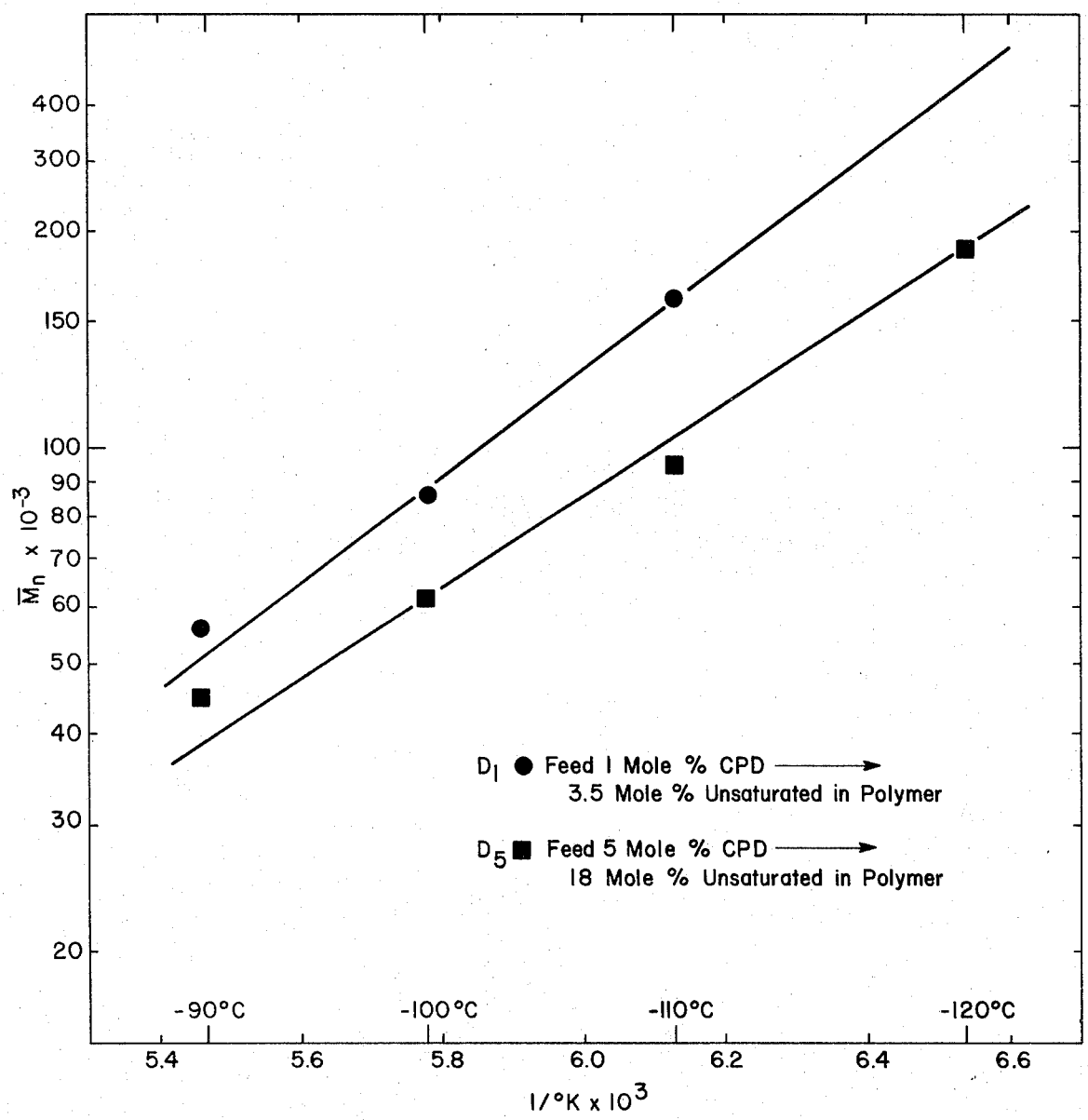
Figure 3:
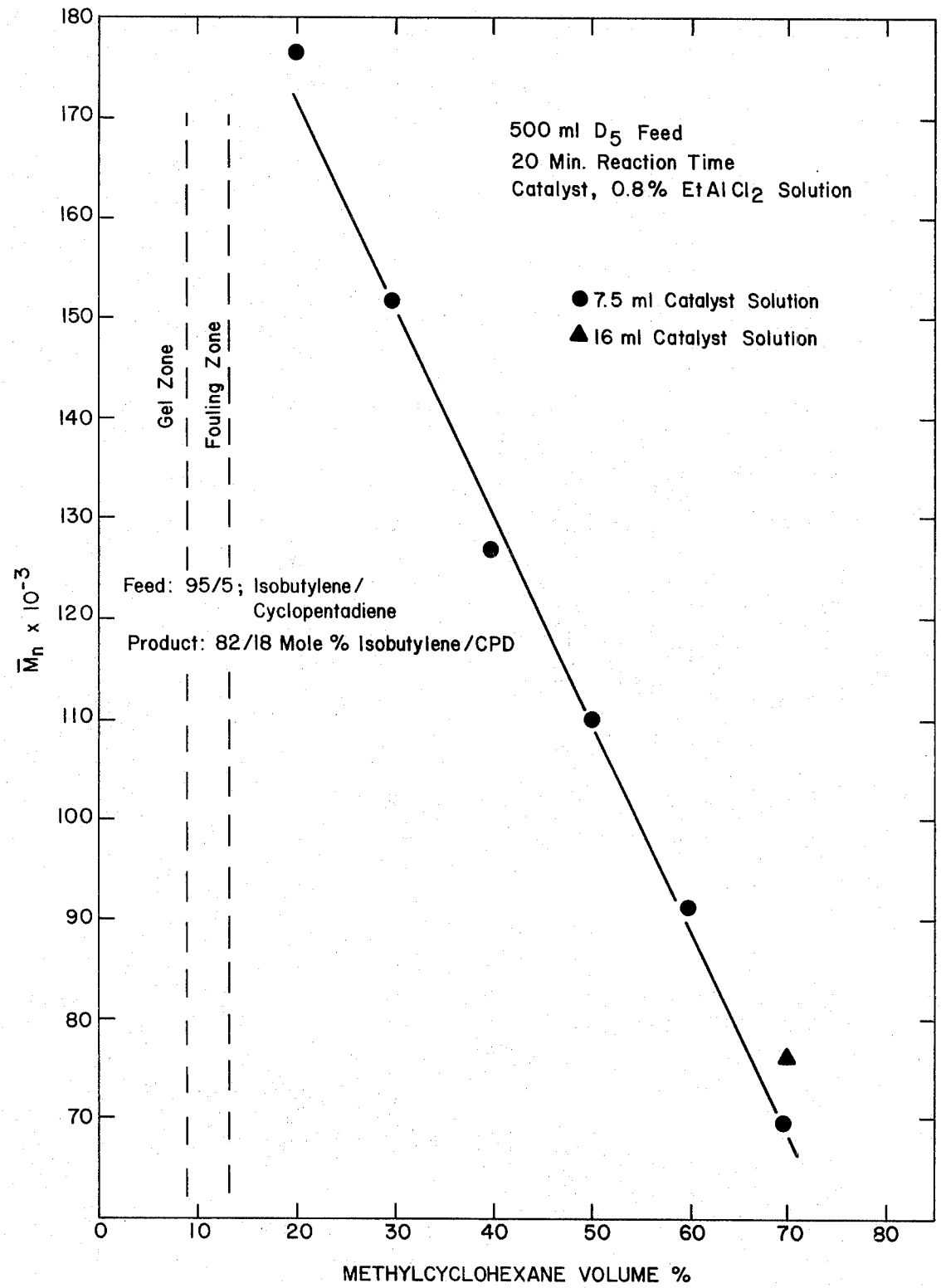
Figure 4:
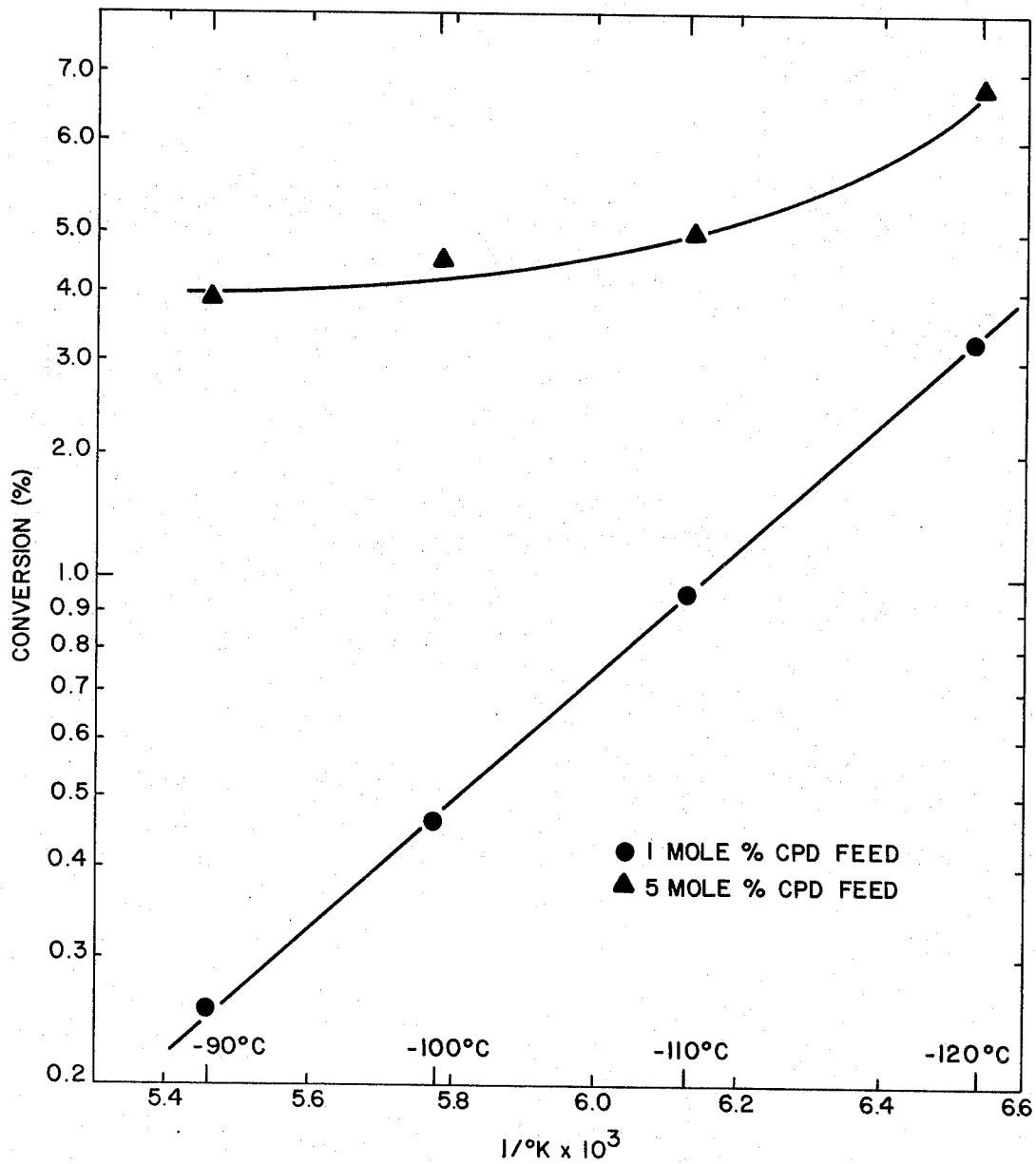
Figure 5:
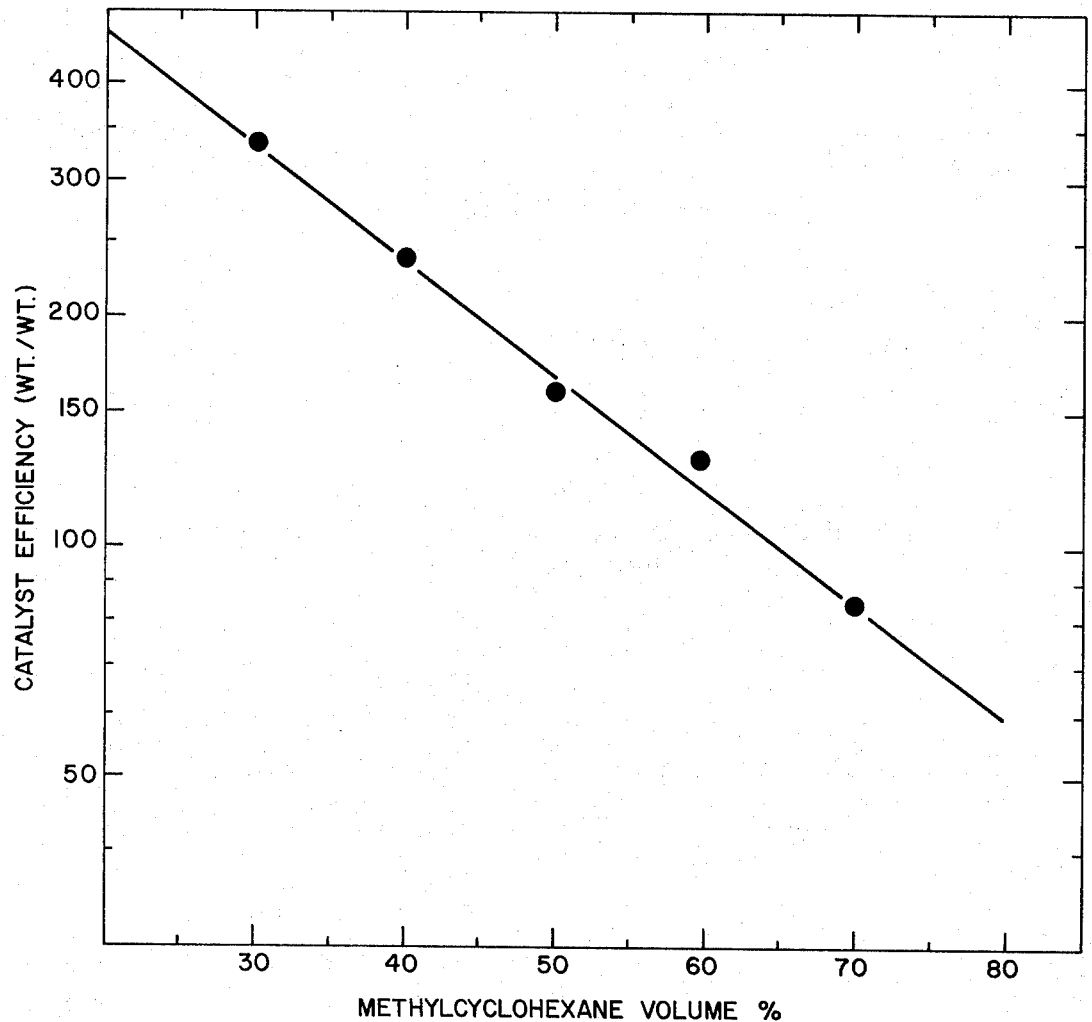

The necessity for utilizing low polymerization temperatures is exemplified by FIG. 2 which shows the exponential decrease in number average molecular weight with increasing temperature. The criticality of selecting the proper quantity of cosolvent is demonstrated in FIG. 3. Too little cosolvent results in precipitation of the polymer with reactor fouling or gelation. Too much cosolvent results in a low molecular weight product. Further benefits of low temperature and proper selective of appropriately low cosolvent concentration are demonstrated in FIGS. 4 and 5. FIG. 4 shows that reactivity is favored by low temperatures (in addition to the molecular weight benefit). FIG. 5 shows that catalyst efficiency is favored by low cosolvent concentration (in addition to the molecular weight benefit).

In practicing the process of this invention, one skilled in the art may proceed as follows in order to determine the preferred reaction conditions. s First, a convenient polymerization temperature below −100°C. is selected. Preferably the temperature is below −110°C., e.g., −120°C Next the desired feed composition, i.e., monomers and ratio of isoolefin to conjugated diene and the cosolvent to be used are selected. Polymerization reactions are carried out using successively greater amounts of solvent. The initial polymerization reaction is carried out using 5 volume percent based on the total of monomer plus solvent of the cosolvent since lesser amounts will be inadequate. In each successive run an additional 5 volume percent is added. The procedure is continued until the reaction medium remains clear throughout the reaction. Turbidity is indicative of precipitation of polymer which leads to reactor fouling or gelation.

The polymer formed is characterized for $\overline{M}n$ and mole % unsaturation. Where a higher $\overline{M}n$ is desired it may be achieved by either lowering the polymerization temperature or where possible using slightly less solvent than determined by the above method, e.g., 1–2 vol percent less, provided that turbidity does not occur. Reduction of polymerization temperature may result in a greater cosolvent requirement. Hence, the aforegoing procedure of adding additional solvent to the reaction medium must be continued until the reaction medium is again clear throughout the polymerization.

Where the mole percent unsaturation is to be adjusted somewhat more or less of the diene is used depending on whether a slightly higher or lower unsaturation is desired. Change in feed composition may require readjusting the cosolvent requirement. Generally, increasing the multiolefin content of the monomer feed decreases the cosolvent requirements of the system.

The optimum reaction conditions are those which give the maximum $\overline{M}n$ at the highest temperature for the desired unsaturation level. The smaller the quantity of cosolvent used the greater the $\overline{M}n$. Economic considerations dictate the use of the warmest temperature practical for polymerization. Use of lower temperatures will necessitate the use of greater amounts of cosolvent. At temperatures below −140°C. the cosolvent requirements for homogeneous polymerization are frequently so great that further reductions in temperature result in lower rather than higher $\overline{M}n$ as a result of the larger quantities of solvent required.

In an alternate aproach to determine the necessary quantity of cosolvent, the reactions are carried out in bulk without using cosolvent. For each different multiolefin content monomer feed, polymerizations are carried out at progressively lower temperatures until the critical homogeneous polymerization temperature for the feed composition is determined. The polymerization is repeated for different feed compositions and the data obtained are the critical homogeneous polymerization temperatures as a function of multiolefin content of the feed. A plot of these data gives the critical homogeneous polymerization temperature curve analogous to that of FIG. 1. The polymer formed is analyzed for multiolefin content and a determination is made of the correlation mole percent unsaturation in the polymer and volume percent multiolefin in the feed.

The polymer formed in bulk polymerization is unsuitable for commercial use since it has a $\overline{M}n$ of less than 120,000. In order to increase the $\overline{M}n$ of the polymer it is necessary to carry out the polymerization at lower temperatures, e.g., less than −100°C., which requires the addition of cosolvent to prevent precipitation of polymer during polymerization.

The quantity of solvent used should be kept to a minimum since excess cosolvent results in the lowering of $\overline{M}n$. In determining the amount of solvent to be used the monomer feed composition is determined. A convenient polymerization temperature below −100°C. is selected.

The minimum cosolvent requirements for a particular isoolefin-multiolefin may be determined by carrying out the polymerization at the critical homogeneous polymerization temperature for the isoolefin-multiolefin feed composition, termininating the polymerization by destroying the catalyst and, with constant stirring, lowering the temperature of the system to the desired polymerization temperature. The polymer which, of course, is by definition insoluble below the critical homogeneous polymerization temperature will precipitate out and the system will appear turbid. The polymer will not be gelled, however, since polymerization was terminated prior to precipitation. The cosolvent selected is then added in incremental amounts until the turbidity disappears. The quantity of solvent so added is a good approximation of the minimum solvent requirements for a given isoolefin-multiolefin feed to be polymerized at a given temperature.

The term "solution polymerization" as used in the specification and claims means a polymerization carried out so that the polymer product remains dissolved throughout the reaction.

Where the diene is cyclopentadiene the preferred cosolvents are methylcyclohexane (MCH) and $CS_2$ utilized at about 15 to about 30 volume percent, e.g., 20 to about 25 volume percent.

Utilizing the process of this invention, it is now possible to prepare such cyclodiene copolymers having as little as 0.5 mole percent unsaturation and as high as 40 mole percent unsaturation. Preferably, these cyclodiene polymers contain about 3 to about 40 percent; more preferably about 6.5 to about 40 mole percent unsaturation; most preferably 8 to about 40 mole percent, e.g., 12 to about 40 mole percent. Particularly preferred polymers contain 16 to about 28 mole percent unsaturation. As a result of the relatively lower reactivity of the unsaturation as compared to the isoprene-diene copolymers, copolymers having incorporated therein about 2–4 mole percent cyclic diene are about as reactive as butyl rubber having an acyclic diene content of about 0.5 to about 1.5 mole percent and require ultra acceleration for sulfur vulcanization. By contrast the higher unsaturation copolymers, e.g., at least 5 mole percent, preferably at least 8 mole percent, may be sulfur vulcanized using the delayed action accelerator cure systems described above.

In general, the copolymers of this invention must not contain more than 40 mole percent unsaturation. When the multiolefin is a cyclic multiolefin about 40 mole percent unsaturation, the glass transition temperature of the polymer is too high. As a result, the polymers have poor low temperature characteristics. The copolymers of this invention have about 5 to about 40 mole percent unsaturation; preferably about 8 to about 40 mole percent; more preferably about 8 to about 35 mole percent; most preferably about 12 to about 35 mole percent; e.g., 16 to about 28 mole percent.

As has been pointed out earlier the highly unsaturated polymers of this invention are substantially as impermeable to air as are commercial low unsaturates, e.g., 1.5 mole percent butyl rubbers. Surprisingly, isoolefin copolymers of CPD or terpolymers of an isoolefin-CPD and an acyclic diene are less permeable to air at the higher unsaturation levels than is the low unsaturation butyl rubber of commerce.

Thus, the process of this invention permits the preparation of isoolefin copolymers, heretofore unattainable, which surprisingly retain all of the advantageous characteristics of conventional low unsaturation butyl rubber while exhibiting improved vulcanization characteristics and in some cases, e.g., CPD copolymers, improved ozone resistance and air impermeability.

The term "substantially gel free" as used in the specification and claims means copolymers containing less than 2 wt. percent gel; more preferably less than 1% gel, e.g., one-half percent gel. The germ "D # " where # is an integer means the volume percent cyclopentadiene in a monomer mixture wherein D represents cyclopentadiene and the integer is the volume percent diene.

The advantages of this invention may be more readily appreciated by reference to the following examples.

EXAMPLE 1

Attempt to copolymerize 95 mole percent and 5 mole percent cyclopentadiene (D5) with triethylaluminum and a cocatalyst at −120°C.

One liter of a solution of isobutylene, cyclopentadiene, and methylcyclohexane in the proportions of 75, 4.7 and 20.3 wt. percent respectively was stirred at −120°C. and 20 ml of a solution of 0.72 percent triethylaluminum in methylcyclohexane was added. No polymerization occured.

3-Bromocyclopentene 0.4945g (3.36 × 10⁻³ moles) was added in a further attempt to initiate the copolymerization. Again no reaction occurred.

EXAMPLE 2

The method of Example 1 was repeated at −90°C. No polymerization occurred. The temperature was warmed to −50°C. and still no reaction occurred. Diethylaluminum chloride (0.2 g) was added without any effect. Additional bromocyclopentene was added (1.3 g) and still no reaction occurred.

Ethylaluminum dichloride (0.16 g) was then added and rapid copolymerization ensued.

EXAMPLE 3

Copolymerization of isobutylene with 5 mole percent cyclopentadiene (D5) at −120°C. using ethylaluminum dichloride.

Reaction of Example 1 repeated using ethylaluminum dichloride (1 percent in methylcyclohexane as catalyst). One half liter of a solution of 75, 4.7, and 20.3 wt. percent isobutylene, cyclopentadiene and methylcyclohexane respectively were stirred at −120°C. and 5 ml of the $EtAlCl_2$ catalyst solution added. The polymerization temperature was maintained at −115° to −120°C for 10 minutes and the reaction was terminated with a few drops of alcohol. The copolymer was coagulated from hot methanol containing a small quantity of base and antioxidant (N-phenyl-β-naphthylamine). The yield was 15.2 g of copolymer with a number average molecular weight of 176,000 and an inherent viscosity of 1.677 (toluene at 25°C.).

EXAMPLE 4

Copolymerization of isobutylene with 7 mole percent cyclopentadiene (D7) was carried out in the method of Example 3 using 7 ml of ethylaluminum dichloride catalyst solution. The reaction temperature was −114° to −120°C for 10 minutes. A yield of 15.0 g of copolymer was obtained with a number average molecular weight of 188,000 and an inherent viscosity of 1.4129 (toluene at 25°C.).

EXAMPLE 5

Copolymerization of isobutylene with 3 mole percent cyclopentadiene (D3) using 3 ml of ethylaluminum dichloride catalyst solution yield 7.65 of copolymer with a number average molecular weight of 221,000 and an inherent viscosity of 2.497 (toluene at 25°C.).

EXAMPLE 6

Copolymerization of isobutylene and isoprene (B15) using methylaluminum dichloride catalysis.

A mixture of 476 ml isobutylene and 84 ml isoprene (at −120°) together with 140 ml n-heptane (at 25°) was stirred at −120°C. and 30 ml of a catalyst solution of 0.82 g $MeAlCl_2$ in 100 ml n-heptane was added over 5 min. The reaction temperature was −115°C. and the polymerization was terminated after 17 minutes. The yield was 27.8 g of copolymer with a number average molecular weight of 171,000.

EXAMPLE 7

Copolymerization of isobutylene and isoprene (B15) using ethylaluminum dichloride.

The experiment of Example 6 was repeated using 40 ml of a catalyst solution of 0.756 $EtAlCl_2$ in 100 ml of n-heptane. The yield was 16.7 g of copolymer of 185,000 number average molecular weight.

EXAMPLE 8

Similar experiments using a B30 feed yielded copolymer of 168,000 and 149,000 number average molecular weight using methyl and ethylaluminum dichloride respectively.

EXAMPLE 9

Copolymer compositions were determined by infrared analysis in case of isobutylene-isoprene copolymers. Isobutylene-cyclopentadiene copolymers as well as terpolymers of isobutylene, cyclopentadiene and isoprene were analyzed by nuclear magnetic resonance spectroscopy.

Figure 6:
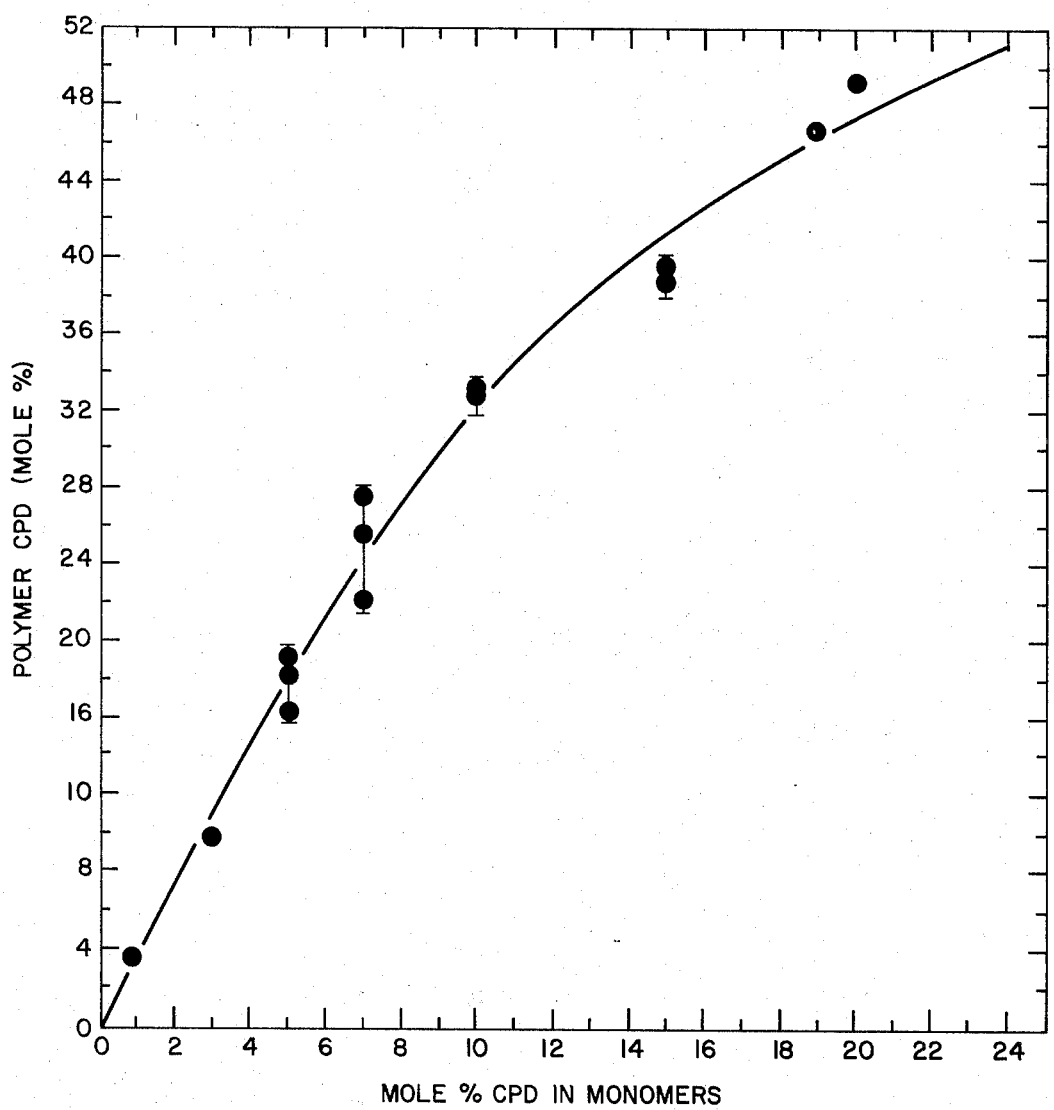
Figure 7:
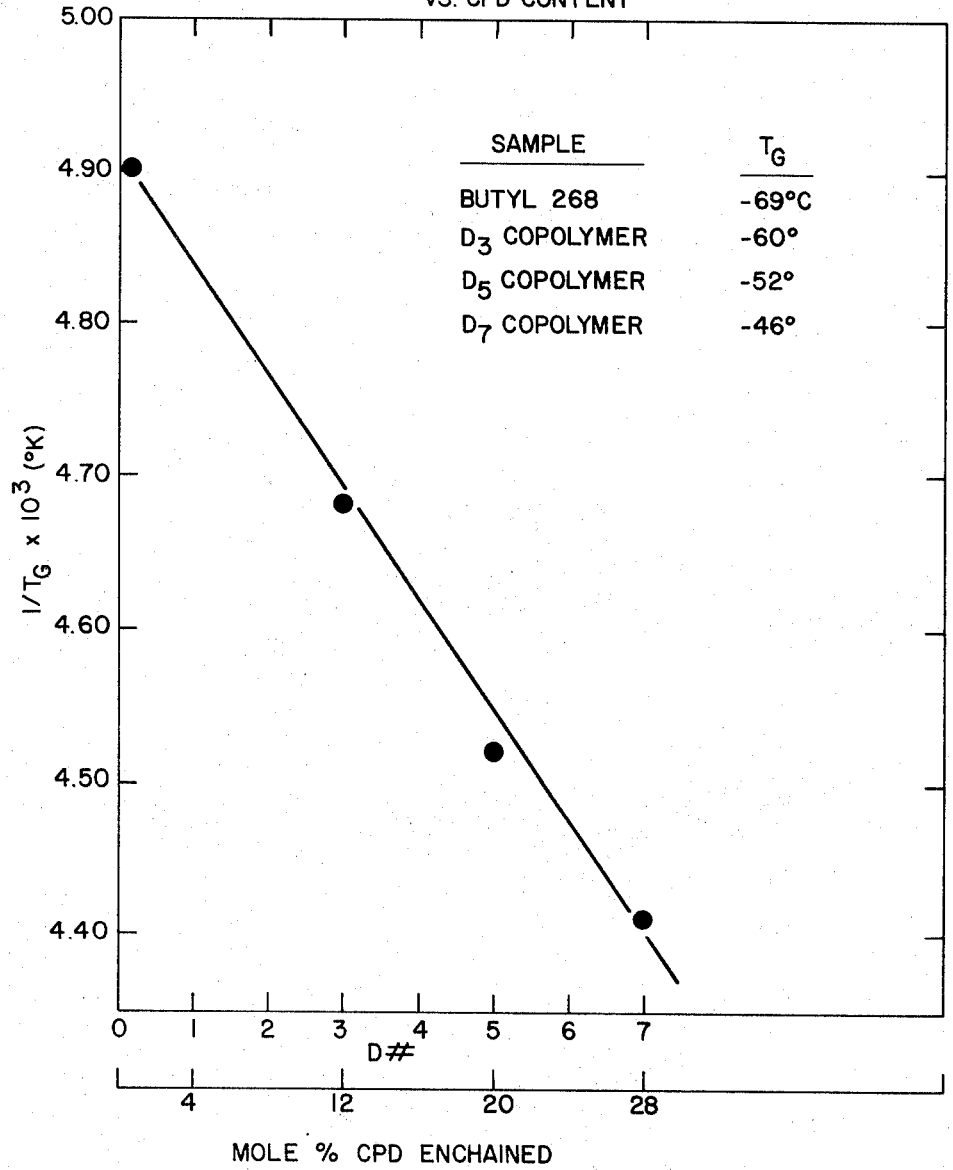
Figure 8:
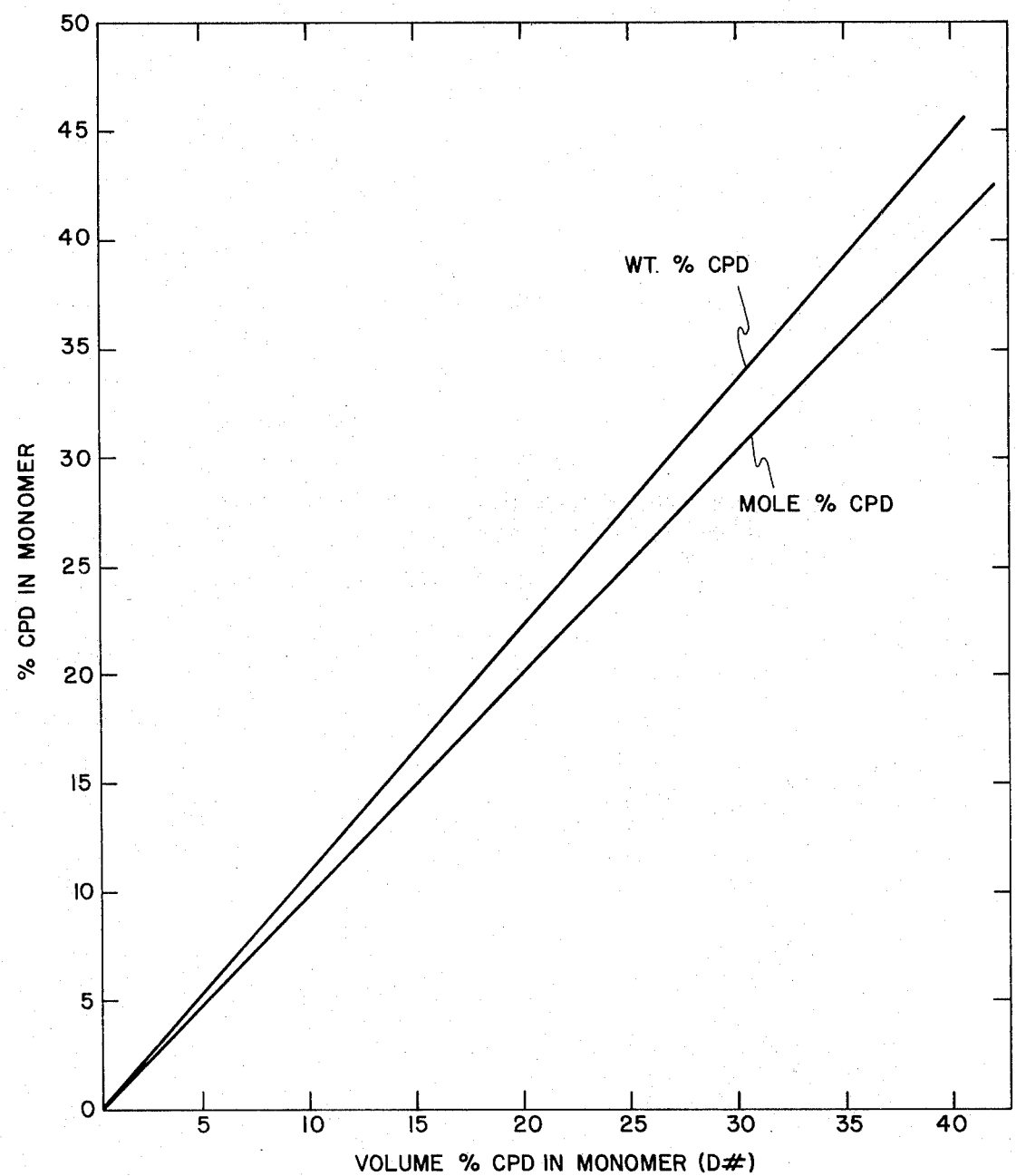

In general, the cyclopentadiene contents of copolymers was three to four times that of the monomer in the feed up to about 7 mole percent CPD based on total monomer in feed (FIG. 6). This correspondence was confirmed by the linear change of glass transition temperature with mole percent CPD in the feed up to D7 (FIG. 7). A correlation between volume percent CPD in monomers and weight or mole percent is presented in FIG. 8.

EXAMPLE 10

Terpolymer of isobutylene isoprene and cyclopentadiene (B10, D5).

A solution of 952 ml isobutylene and 112 ml isoprene (at −120°C.) together with 56 ml cyclopentadiene (at −78°C.) and 280 ml n-heptane (at 25°C.) was stirred at −120°C. and 50 ml of a catalyst solution of 1 percent ethylaluminum dichloride in n-heptane was added. The reaction temperature was −118° to −120°C. and the reaction was terminated after 20 min.

A yield of 36.8 g of terpolymer was isolated with a number average molecular weight of 148,000. Analysis by TAC 100 MHz nmr revealed a composition of 74 percent isobutylene, 18 percent cyclopentadiene and 8 percent isoprene (mole), indicating terpolymer enchained diene in quantities close to that of copolymer.

EXAMPLE 11

The copolymerization of isobutylene with 5 mole percent cyclopentadiene (D5) in the presence of 20 percent methylcyclohexane cosolvent was carreid out at −120°C. using equimolar quantities of different hydrocarbylaluminum dihalide catalysts. The results tabulated below emphasize that R may be varied but catalysts with lower hydrocarbyl groups have higher efficiency and are preferred.

COMPARISON OF ALKYLALUMINUM DIHALIDES IN HYDROCARBON SOLUTION
D-5 COPOLYMERIZATION WITH 20% METHYLCYCLOHEXANE COSOLVENT (−120°C.)*

| Catalyst | | | Monomer Conversion % | $\overline{M}n \times 10^{-3}$ | $[\eta]/25°$ toluene | Catalyst Efficiency | | |
|---|---|---|---|---|---|---|---|---|
| Species | Mole | Grams | | | | wt/wt | g/mole | mole |
| Isobutyl AlCl$_2$ | 6.3×10$^{-4}$ | 0.098 | 4.5 | 191,000 | 1.5799 | 139 | 21,500 | 0.113 |
| Ethyl AlCl$_2$ | 6.3×10$^{-4}$ | 0.080 | 6.0 | 212,000 | 1.5168 | 225 | 28,500 | 0.134 |
| Methyl AlCl$_2$ | 6.3×10$^{-4}$ | 0.071 | 6.9 | 238,000 | 1.5969 | 296 | 33,200 | 0.139 |
| Ethyl AlBr$_2$ | 6.3×10$^{-4}$ | 0.137 | 3.1 | 226,000 | 1.4214 | 69 | 14,920 | 0.066 |
| Ethyl AlI$_2$ | 6.3×10$^{-4}$ | 0.203 | 0.4 | — | 0.4028 | 6 | 1,905 | — |

*Isobutylene, 380 ml; cyclopentadiene, 20 ml; methylcyclohexane, 100 ml; catalyst solution, 10 ml containing indicated quantity of RAlX$_2$.

EXAMPLE 12

The effect of dilution upon catalyst solution was determined using a constant quantity of ethylaluminum dichloride catalyst.

A D5 copolymerization feed consisting of 380 ml isobutylene (at −120°C.), 20 ml cyclopentadiene (at −78°C.) and 100 ml methylcyclohexane (at 25°C.) was stirred at −120° and solution containing a total of 0.08 g of ethylaluminum dichloride in methylcyclohexane at various dilution levels added. The reactions were permitted to proceed for 20 minutes and were terminated with a few drops of alcohol. The results are tabulated below. Catalyst solution concentrations are expressed in grams per 100 ml.

INFLUENCE OF CATALYST SOLUTION CONCENTRATION
(D5 COPOLYMERIZATION, −120°C., 0.08 EtAlCl$_2$)

| Catalyst Concentration (%) | Monomer Conversion | Catalyst Efficiency | $\overline{M}n$ |
|---|---|---|---|
| 40 | 3.8% | 144 | 157,000 |
| 20 | 4.3 | 166 | 157,000 |
| 10 | 4.2 | 160 | 208,000 |
| 5 | 5.7 | 215 | 191,000 |
| 2.5 | 3.4 | 129 | 189,000 |
| 1.25 | 4.6 | 175 | 177,000 |

The results show that the concentration of the catalyst solution is not a significant factor.

What is claimed is:

1. A process for preparing substantially gel-free copolymers consisting essentially of an isoolefin having about four to about 10 carbon atoms and conjugated dienes having about five to about 14 carbon atoms wherein said dienes are selected from the group consisting of (1) at least one acyclic diene wherein said acyclic diene is isoprene, piperylene, 2,3-dimethylbutadiene, or mixtures thereof, (2) cyclopentadiene and (3) cyclopentadiene and at least one second diene wherein the second diene is isoprene, piperylene, 2,3-dimethyl butadiene, or mixtures thereof comprising at least 8 to about 40 mole percent unsaturation; said polymer having a number average molecular weight of at least 120,000, which comprises carrying out a solution polymerization at a temperature below $-100°C$. in a feed consisting of about 5 to about 40 volume percent of a cosolvent and about 95 to about 60 volume percent monomers using as the catalyst a catalytic amount of a hydrocarbyl-aluminum dihalide, said dihalide being a dibromide or a dichloride; wherein said polymerization is carried out to a conversion level of about 2 to about 20 percent.

2. The process of claim 1 wherein the catalyst is ethylaluminum dichloride, isobutylaluminum dichloride or methylaluminum dichloride.

3. The process of claim 1 wherein the cosolvent is isopentane, n-pentane, n-hexane, cyclohexane, n-heptane, methylcyclohexane or carbon disulfide.

4. The process of claim 1 wherein the isoolefin is isobutylene.

5. The process of claim 4 wherein the diene is cyclopentadiene.

6. The process of claim 4 wherein the dienes comprise isoprene and cyclopentadiene.

7. The process of claim 1 wherein the isoolefin is isobutylene, the diene is cyclopentadiene, and the cosolvent is methylcyclohexane present at about 5 to about 30 volume percent based on total monomers plus cosolvent.

8. The process of claim 7 wherein the cosolvent is included in the reaction medium at about 10 to about 25 volume percent.

9. The process of claim 1 wherein the cosolvent is carbon disulfide present in the reaction medium at at least 5 volume percent.

10. The process of claim 9 wherein the isoolefin is isobutylene and the diene is cyclopentadiene.

11. The process of claim 1 wherein the isoolefin is isobutylene, 2-methyl-1-butene, 4-mehtyl-1-pentene and 3-methyl-1-butene.

12. The process of claim 1 wherein the polymerization temperature is about $-115°C$. to about $-130°C$.

13. The process of claim 7 wherein the catalyst is isobutylaluminium dichloride or ethylaluminium dichloride.

* * * * *